United States Patent [19]
Otake et al.

[11] Patent Number: 5,718,472
[45] Date of Patent: Feb. 17, 1998

[54] AUTOMOTIVE SLIDE ROOF SYSTEM

[75] Inventors: Joji Otake; Yoshitaka Higuchi, both of Tochigi-ken, Japan

[73] Assignee: Yachiyo Kogyo Kabushiki Kaisha, Tokyo, Japan

[21] Appl. No.: 667,574

[22] Filed: Jun. 21, 1996

[51] Int. Cl.⁶ ................................................. B60J 7/05
[52] U.S. Cl. ...................... 296/221; 296/213; 296/223
[58] Field of Search ........................ 296/216, 221–224, 296/213

[56] References Cited

U.S. PATENT DOCUMENTS

| | | | |
|---|---|---|---|
| 4,998,771 | 3/1991 | Schreiter et al. | 296/223 |
| 5,092,651 | 3/1992 | Baldwin et al. | 296/223 |

FOREIGN PATENT DOCUMENTS

| | | | |
|---|---|---|---|
| 55-15325 | 4/1980 | Japan . | |
| 0290718 | 11/1990 | Japan | 296/222 |

*Primary Examiner*—Dennis H. Pedder
*Attorney, Agent, or Firm*—Skjerven Morrill Macpherson Franklin & Friel; Thomas S. MacDonald

[57] ABSTRACT

In an automotive slide roof system comprising a slide roof panel which is capable of both tilting and sliding to provide two modes of opening a part of a fixed roof of a motor vehicle, each of the stays for the slide panel is provided with a cam slot including an inclined section which is adapted to tilt up a rear end portion of the slide panel as elevator links guided by guide rails are pushed forward from a fully closed state by push-pull cables, and lateral pins attached to the elevator links move forward inside the cam slots, and the elevator links are adapted to tilt forward as the elevator links are pulled rearward from the fully closed state of the slide panel by the push-pull cables, thereby lowering a rear end of the slide panel so as to allow the slide panel to be slid open without being interfered by a part of the fixed roof located behind the opening. Thus, the cam slots are used for tilting up the slide panel while the tiltable elevator links are used for lowering the rear end of the slide panel before sliding it rearward so that the vertical dimension of the overall mechanism can be minimized.

16 Claims, 11 Drawing Sheets

AUTOMOTIVE SLIDE ROOF SYSTEM

TECHNICAL FIELD

The present invention relates to an automotive slide roof system, and in particular to an automotive slide roof system comprising a slide roof panel which is capable of both tilting and sliding to provide two modes of opening a part of a fixed roof of a motor vehicle.

BACKGROUND OF THE INVENTION

Automotive slide roof systems, which are also called as sun roof systems, are installed in many modern motor vehicles. Such a slide roof system is often capable of both tilting up the slide panel and sliding it in the fore-and-aft direction to provides two modes of opening a part of the fixed roof.

In any slide roof system, it is normally required that the fixed roof and the slide panel in its closed state should define a flush surface, and a highly complex mechanism is required to tilt and stow away the slide panel without creating any mechanical interferences between the slide panel and the fixed roof. According to a conventional slide roof system, a pair of sliders are slidably engaged by guide rails provided along either side of an opening in the fixed roof of a vehicle body, and are actuated by push-pull cables in the fore-and-aft direction. Cam members provided with slots are attached to the slide panel, and pins provided in the sliders are engaged in the cam slots to raise the rear end of the slide panel to tilt up the slide panel, and to lower the rear end of the slide panel to allow it to be slid rearward under the fixed roof without being interfered thereby. An example of such a structure is disclosed in Japanese patent publication (kokoku) No. 5515325.

However, according to this conventional structure, a plurality of pins are engaged in the cam slots to provide a relatively rigid support for the slide panel, and the cam members tend to be undesirably large in size. Furthermore, relatively long cam slots are required to achieve a desired lift of the slide panel, and this not only increases the size of the cam mechanism but also necessitates a longer stroke for the sliders to achieve a required lift. In automotive slide roof systems, it is highly desired to reduce the vertical dimension of the slide roof system so as to ensure a sufficient head space in the cabin for a given height of the roof. It is equally important to ensure a sufficient rigidity to the support for the slide panel not only at its fully open and closed states but also during its sliding movement.

According to the conventional structure, the sliders are directly actuated by the push-pull cables, and the slide panel is retained at its tilted up state solely by the push-pull cables. Because the slide panel is guided by the guide rails in otherwise freely slidable manner, and the push-pull cables are not capable of sufficiently rigidly retaining the slide panel, the slide panel may rattle when the vehicle body is subjected to vibrations and accelerations.

Another known problem with the convention structure is that the seal member attached to the periphery of the slide panel, in particular the front part of the seal member, tends to wear out in a relatively short time. This is primarily due to the friction with the surrounding surface of the opening in the fixed roof and the pressure it receives from this surface as the slide panel is tilted up, and this problem is particularly pronounced because the center of rotation of the slide panel as it is tilted up is located inside the slide panel, and the seal member is highly compressed as the slide panel is tilted up.

Yet another known problem with the convention structure is that the limit of the tilt up movement of the slider panel is defined by a guide pin abutting an end of a cam slot, and the resulting wear in the mutually abutting surfaces of the pin and the cam member may create a play over time. This is detrimental to the design to maintain a rigid support for the slide panel. It is conceivable to provide stopper members in the guide rails, but it is difficult to do so because of the need to avoid mechanical interferences with the sliders for the sliding movement of the slide panel.

BRIEF SUMMARY OF THE INVENTION

In view of such problems of the prior art, a primary object of the present invention is to provide an automotive slide roof system which is compact in size, and, in particular, has a smaller vertical dimension than the conventional slide roof systems.

A second object of the present invention is to provide an automotive slide roof system which provides a highly rigid support for the slide panel when it is tilted up.

A third object of the present invention is to provide an automotive slide roof system which provides a highly rigid support for the slide panel when it is being slid in the longitudinal direction.

A fourth object of the present invention is to provide an automotive slide roof system which is free from wear and damages even after long use.

A fifth object of the present invention is to provide an automotive slide roof system which is reliable in operation.

A sixth object of the present invention is to provide an automotive slide roof system which is easy and economical to manufacture.

According to the present invention, these and other objects can be accomplished by providing an automotive slide roof system having a slide panel which can be selectively tilted up and slid open, comprising: an opening provided in a fixed roof of a vehicle body, and having a longitudinal line; a pair of guide rails extending along either side of the opening in parallel with the longitudinal line, each of the guide rails including a base, an upright wall, and an upper flange extending laterally from an upper end of the upright wall; a slide panel having a pair of stays depending therefrom along either side thereof; a cam slot provided in each of the stays and including an inclined section; a front slider secured to a front end of each of the stays to be slidably engaged by an associated one of the guide rails; a pair of substantially triangular elevator links each including a first corner provided with a lateral pin engaged by the cam slot of an associated one of the stays, a second corner provided with a rear slider slidably engaged by an associated one of the guide rails, and a third corner provided with roller means adapted to be engaged by the base of the guide rail when the slide panel is being tilted up, and by the upper flange of the guide rail when the slide panel is being slid open; and a push-pull cable attached to each of the rear sliders to actuate the rear slider in either direction along the longitudinal line; the upper flange being provided with a cut-out for allowing passage of the roller means from a first position at which the roller means is engaged by the base to a second position at which the roller means is engaged by an upper surface of the upper flange; the inclined section of each of the cam slots being adapted to tilt up a rear end portion of the slide panel as the elevator links are pushed forward from a fully closed state of the slide panel by the push-pull cables attached to the rear sliders, and the lateral pins are moved in the cam slots; each of the elevator links being adapted to tilt forward as the elevator links are pulled rearward from the fully closed state of the slide panel by the push-pull cables, thereby lowering a rear end of the slide panel so as to allow the slide panel to be slid open without being interfered by a part of the fixed roof located behind the opening.

Thus, the cam slots are used for tilting up the slide panel while the tiltable elevator links are used for lowering the rear end of the slide panel before sliding it rearward so that the vertical dimension of the overall mechanism can be substantially reduced as compared to the conventional structure depending on the pin and slot cam structure for both tilting up and down the slide panel for the tilt up open mode and the slide open mode, respectively. In particular, because the upper flange of each guide rail is held between the rear slider and the roller means when the slider means is at the second position, the slide panel can be slid rearward from and forward to its fully closed state substantially without any play. The roller means may consist of simple sliders, but more preferably consist of rollers which can roll over the corresponding surfaces with a minimum friction.

Typically, the longitudinal direction coincides with the fore-and-aft direction of the vehicle body, but the present invention is not limited by any such particular orientation. For instance, the longitudinal line may coincide with the lateral direction of the vehicle body, and such an embodiment may be convenient for recreation vehicles. Also, the shape of the slide panel is typically rectangular, but it is obvious for a person skilled in the art that the present invention can be equally applied to the cases where the slide panel is provided with a circular, oval, polygonal or other shape.

In view of reducing any play which the slide panel may involve during its tilting movement, each of the rollers and each of the rear sliders may be engaged between the upper flange and the base of an associated one of the guide rails when the roller is at the first position. In view of reducing any play which the slide panel may involve during its sliding movement, it is possible to provide retaining means which urges the rollers against the upper surfaces of the upper flanges of the guide rails when the rollers are at the second position, and which is adapted to move jointly with the rollers as the slide panel is slide rearward from the fully closed state. The retaining means may be provided in a drip channel which is required to move jointly with the slide panel to collect water dripping from the slide panel as the slide panel is being slid rearward to be stowed under the fixed roof. This also provides a convenient means for moving the drip channel jointly with the slide panel. To positively secure the drip channel when the slide panel is fully closed, and the catch member is disengaged from the roller, a lateral flange provided in each of the guide rails may be formed with a notch or other equivalent means which is adapted to engage a part of an associated one of the catch members as the elevator link is moved forward to fully close the slide panel and the roller are disengaged from the catch members.

If each of the guide rails is provided with a ramp upon which each of the rollers rides over as the elevator link is pulled rearward and the pin reaches a rear end of the cam slot, the roller can particularly smoothly move over from the first position to the second position. Minimizing wear in mutually abutting surfaces is essential for avoiding creation of plays in the overall mechanism. In particular, when the slide panel is pushed into its full closed state, the mechanism tends to suffer a substantial impact. To avoid any wear in mutually abutting surfaces resulting from such impacts, preferably, each of the elevator links is provided with a front surface which is adapted to push an opposing rear surface of an associated one of the stays when the slide panel is being pushed forward by the push-pull cables via the rear sliders and the elevator links. More preferably, the front surface of each of the elevator links and the rear surface of the corresponding stay are provided with mutually complementary curved surfaces.

According to a preferred embodiment of the present invention, each of the guide rails comprises a C-shaped upright wall defining an inner bore extending along the longitudinal line, and each of the push-pull cables is passed inside an associated one of the inner bores, each of the rear sliders being provided with a cable holder which is located inside the corresponding inner bore to secure a free end of an associated one of the push-pull cables, a stopper block being provided inside each of the inner bores to define an end of a forward movement of the corresponding elevator link. Thus, the push-pull cables may be passed in o a highly protected area. Because the stopper block cooperates with the cable holder along the line passing through the push-pull cable, the elevator link and other parts of the mechanism are protected from impacts resulting from the movement of the push-pull cables, and are thereby made less prone to wear and damages.

To securely support the slide panel during its tilted up state, it is preferable to support an intermediate part of each of the stays attached to the slide panel in addition to the rear sliders which are supported by the push-pull cables. The front sliders are freely slidable and do not provide a support for the slide panel. To this end, it is preferable to provide a support lever having a first end pivotably attached to an intermediate part of each of the stays, and a second end slidably engaged by the corresponding guide rail, each of the support levers being provided with an engagement block which engages a front edge of an upper flange of the corresponding guide rail as the support lever is raised by a tilting movement of the slide panel. The slide panel is typically subjected to aerodynamic downward force when it is tilted up and the vehicle is running at high speeds. The engagement between the engagement block and the front edge of the upper flange of the guide rail provides a secure support against such a force.

It is known that the rubber seal of the slide panel, in particular the front part thereof, tends to wear out rapidly during use. This can be avoided by giving a slightly receding movement to the slide panel as it is being tilted up and down so that the friction and the pressure applied to the rubber seal along the front edge of the slide panel may be reduced. This can be accomplished by a structure in which each of the support levers is provided with a front cam surface which abuts an opposing end surface of a stopper block securely attached to the corresponding guide rail, the front cam surface being profiled so as to cause a slight receding movement to the support lever by cooperating with the opposing end surface of the stopper block as the support lever is raised with its front end up by the slide panel.

The cam surface may be provided in the engagement block. To ensure smooth operation of the engagement block and/or the cam surface, the engagement block or the member defining the cam surface may be resiliently supported by a part of the support lever. To ensure reliable operation of the engagement block and/or the cam surface, the support lever is provided with an extension which positively disengages the engagement block or the member defining the cam surface from the cooperating edge or the surface by directly pushing down the resiliently supported member as the support lever is lowered by the slide panel.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
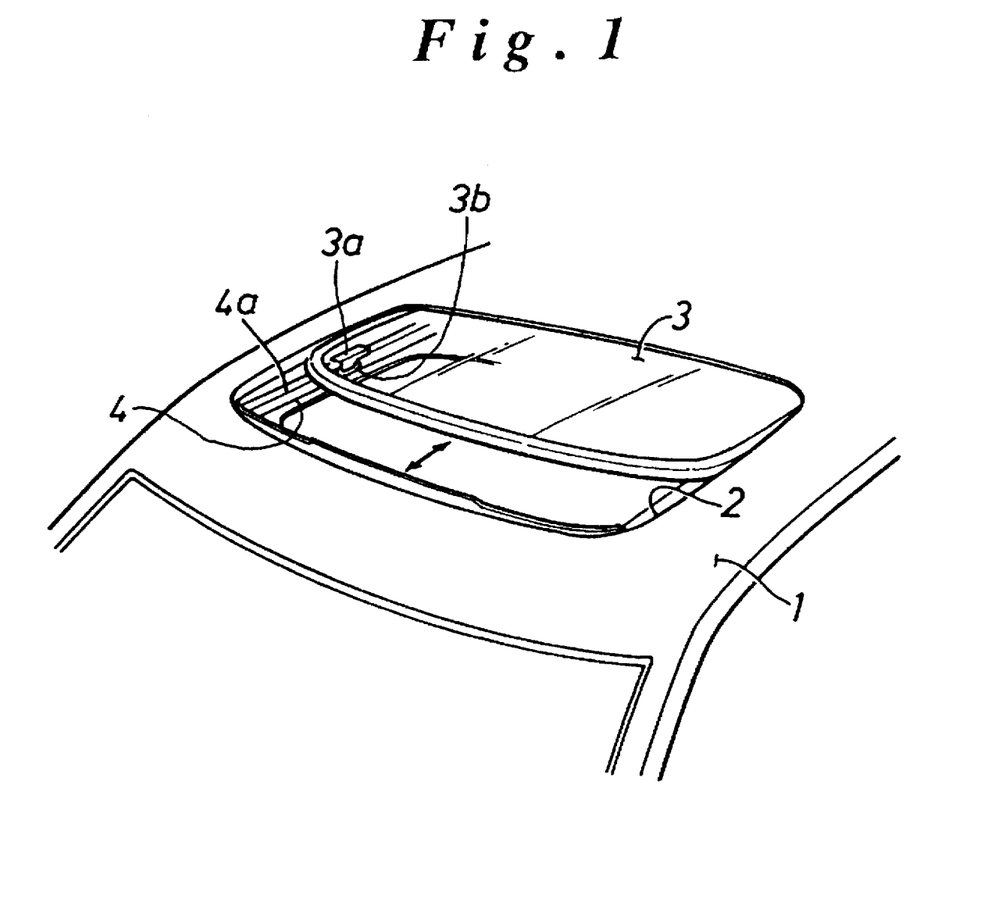
FIG. 1 is an external perspective view of an embodiment of the automotive slide roof system according to the present invention.

FIG. 1 generally illustrates the external view of an embodiment of the automotive slide roof system according to the present invention. A rectangular opening 2 which is somewhat laterally elongated is formed in a fixed roof 1 of the vehicle body, and is selectively opened and closed by a moveable slide panel 3 which is typically made of a sheet glass panel. The entire assembly of the automotive slide roof system is symmetric about a longitudinal center line of the vehicle body, and the following description is directed only to one side of the structure unless otherwise specified.

Figure 2:
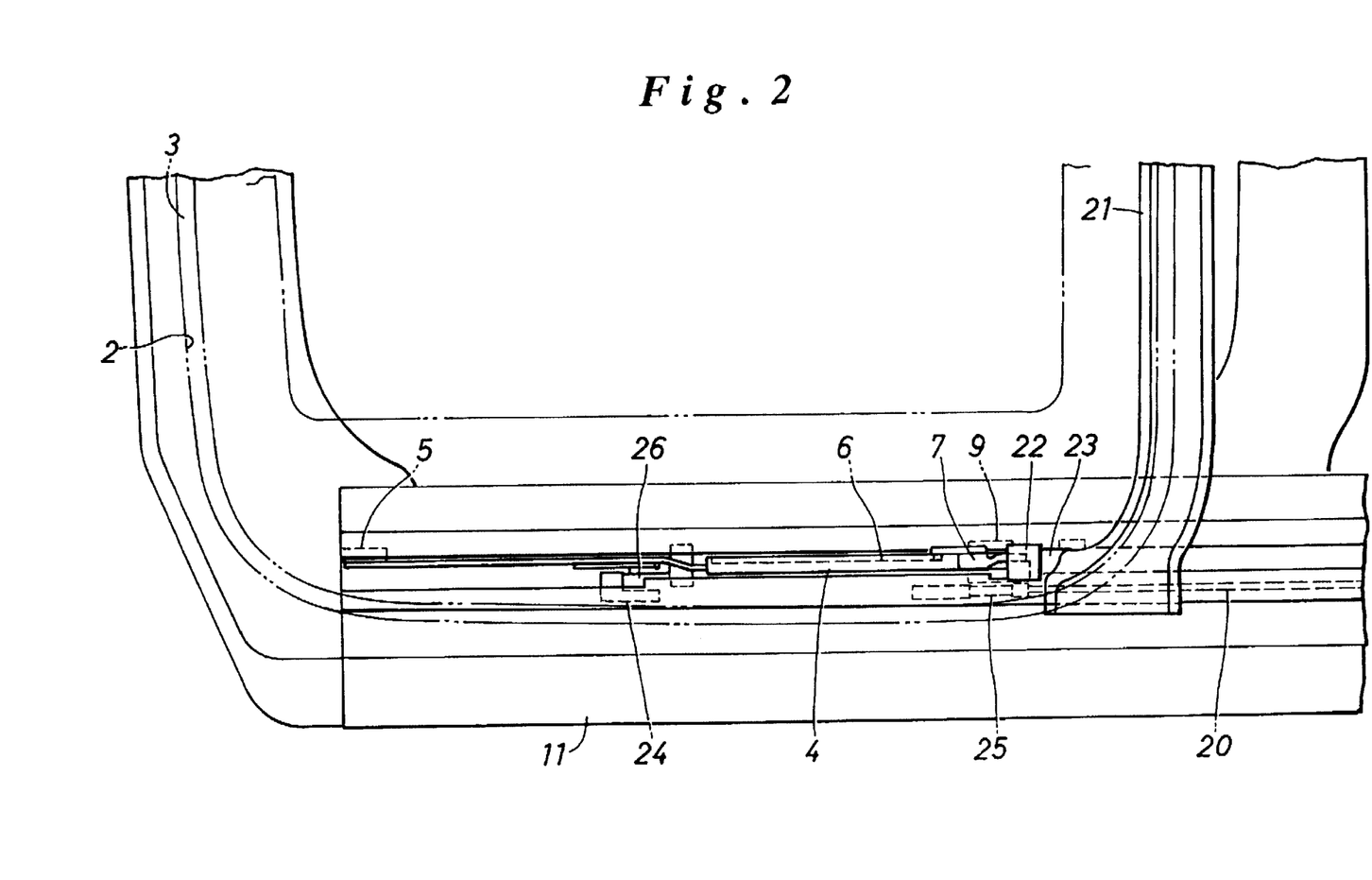
FIG. 2 is an enlarged fragmentary plan view of a part of the slide roof system.
Figure 3:
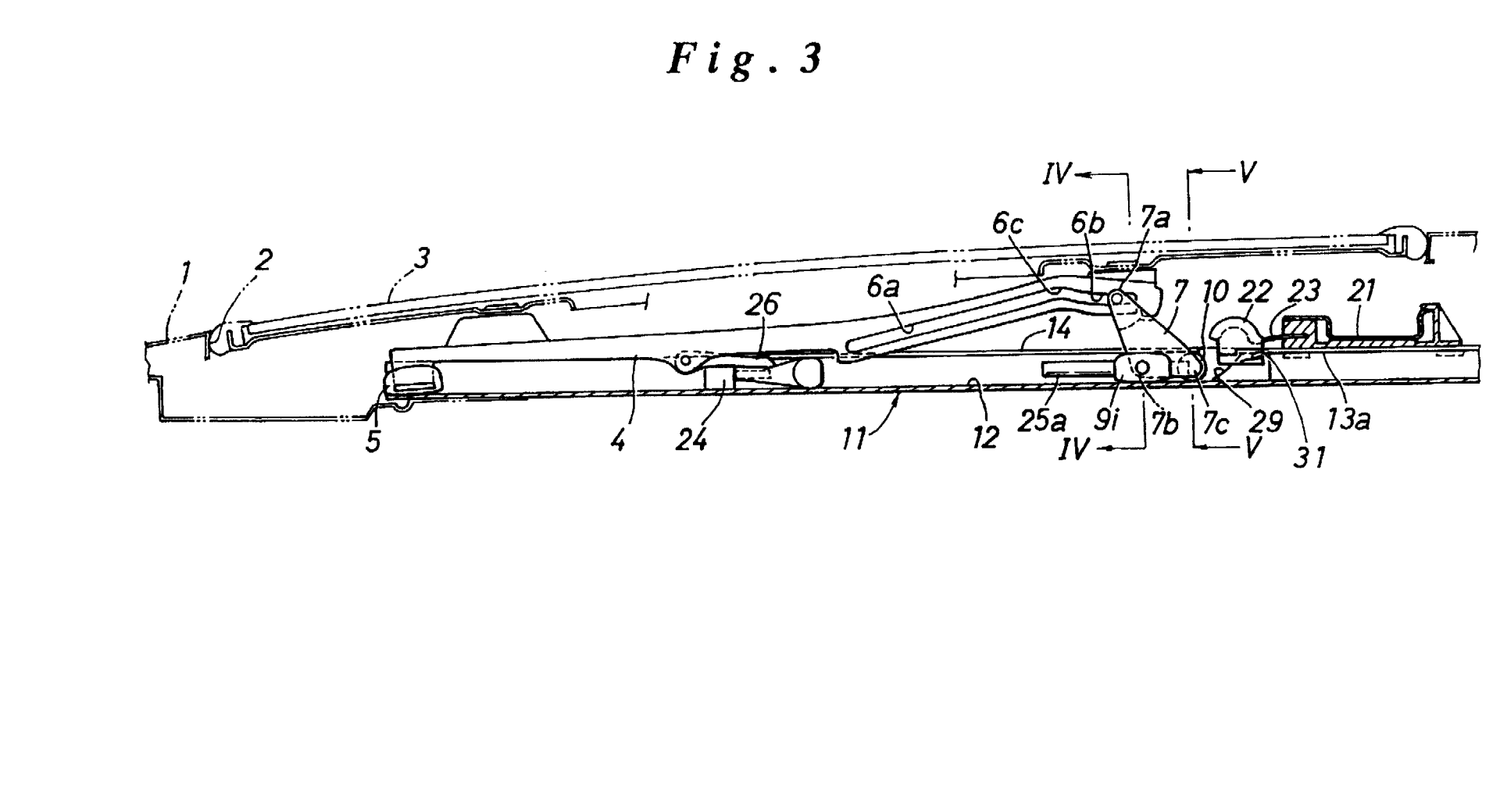
FIG. 3 is a sectional side view of the slide roof system at its fully closed state.

Referring to FIGS. 2 and 3, a longitudinally extending stay 4 is fixedly secured to the inner surface of the moveable slide roof along each side thereof. A front slider 5, which engages a guide rail 11 as described hereinafter, is attached to the inner side of a front end of the stay 4. A rear end of the stay 4 is provided with a guide slot 6 consisting of an inclined section 6a which is located in a frontmost part of the guide slot 6 and generally inclines upward as it extends rearward, a horizontal section 6b which is located in a rearmost part of the guide slot and extends generally horizontally, and a curved section 6c which smoothly connects the inclined section 6a with the horizontal section 6b.

Figure 4:
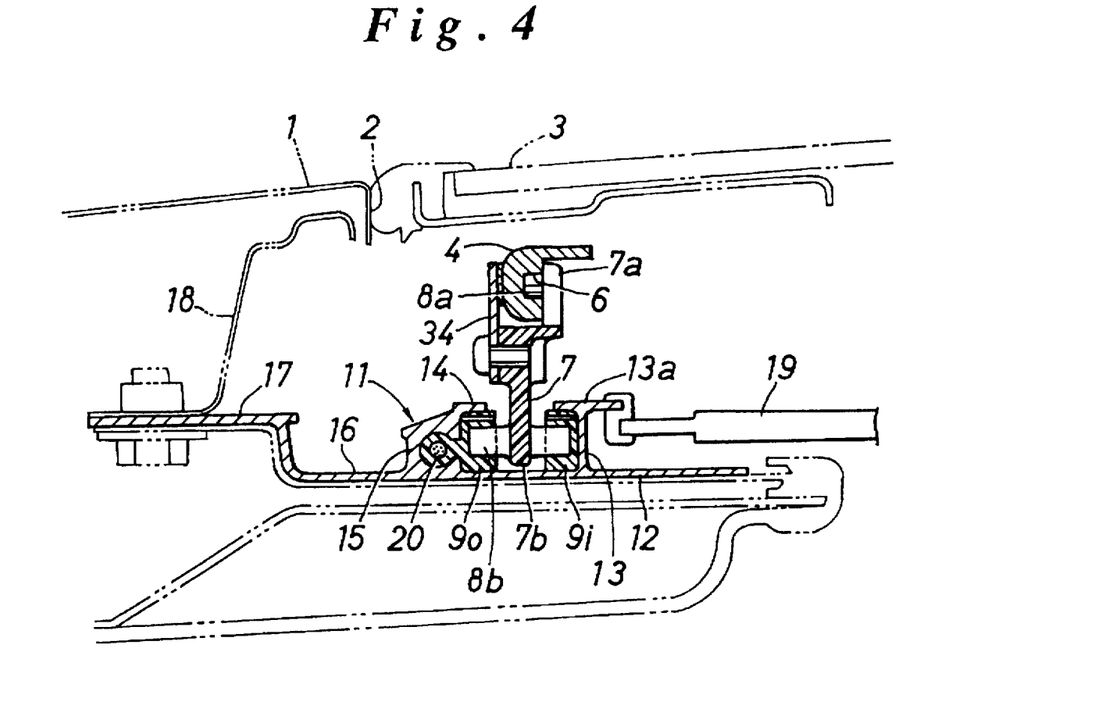
FIG. 4 is a sectional view taken along line IV—IV of FIG. 3.
Figure 5:
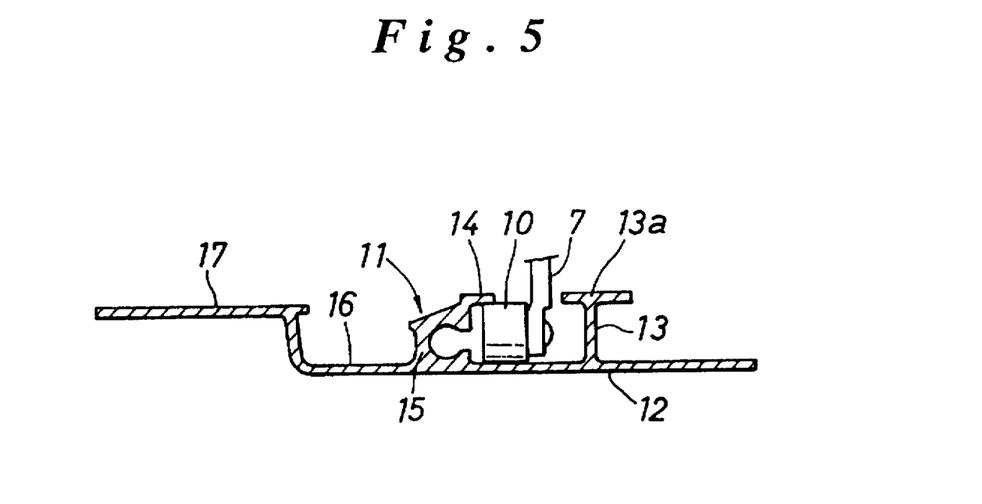
FIG. 5 is a sectional view taken along line V—V of FIG. 3.

As illustrated in FIG. 4, a pin 8a extending laterally from a first corner 7a of a triangular elevator link 7 is engaged in this guide slot 6. A second pin 8b is passed laterally through a second corner 7b of the elevator link 7, and two projecting ends of the second pin 8b are pivotably engaged by two halves 9o and 9i of a rear slider 9 which is slidably received in the guide rail 11. A third corner 7c of the elevator link 7 is provided with a roller 10 which is likewise engaged by the guide rail 11.

The guide rail 11 is made of extruded aluminum alloy, and extends along each side of the opening 2 of the fixed roof 1.

As best illustrated in the cross sectional view of FIG. 4, the guide rail 11 comprises a flat base 12, a T-shaped inner upright wall 13 having an upper flange 13a, a C-shaped outer upright wall 15 having an upper flange 14 extending toward the inner upright wall 13, and a gutter 16 extending outwardly from the base 12. A horizontal outer flange 17 extends outwardly from an upper and outer end of the gutter 16, and is fixedly secured to a stiffener 18 which is in turn fixedly secured to the inner surface of the fixed roof 1. The guide rail 11 is generally attached to a side frame, shown in imaginary lines in FIG. 4, which is in turn securely attached to the fixed roof 1.

The inner upright wall 13 and the gutter 16 extend longitudinally substantially over the entire length of the guide rail 11 whereas the upper flange 14 of the outer upright wall 15 is absent over a certain length in a front end portion of the guide rail 11. The upper flange 13a of the inner upright wall 13 engages a side edge of a sun shade 19 with its inner edge, and engages the front slider 6 and the inner half 9i of the rear slider 9 with its outer edge. The upper flange 14 of the outer upright wall 15 engages the outer half 9o of the rear slider 9 which is actuated in the fore-and-aft direction by a push-pull cable 20 connected thereto, and the roller 10. The push-pull cable 20, along with a cable holder 25 attaching it to the rear slider 9, is passed inside an internal bore of the C-shaped upright wall 15. The gutter 16 collects rainwater, and conducts it to water ejecting pipes not shown in the drawing.

A drain channel 21 extends laterally across the two guide rails 11 and is slidably engaged by the upper flange 14 of the outer upright wall 15 of each of the guide rails 11. The drain channel 21 receives water which may drip from the rear edge of the slide panel 3 and the opposing edge of the fixed roof 1, and conducts it to the gutter 16 provided in each of the guide rails 11. Each lateral end of the drain channel 21 carries a downwardly concave catch member 22 via a resilient sheet spring 23 so as to resiliently engage the associated roller 10 as described hereinafter.

The structure of this slide roof system is now described in more detail along with the mode of operation of this system. Referring to FIG. 3 showing the fully closed state of the slide roof system, the rear slider half 9o and the roller 10 are both engaged by the lower surface of the upper flange 14, and the elevator link 7 is in its upright condition, or the first corner 7a of the elevator link 7 is located at its elevated position.

Figure 6:
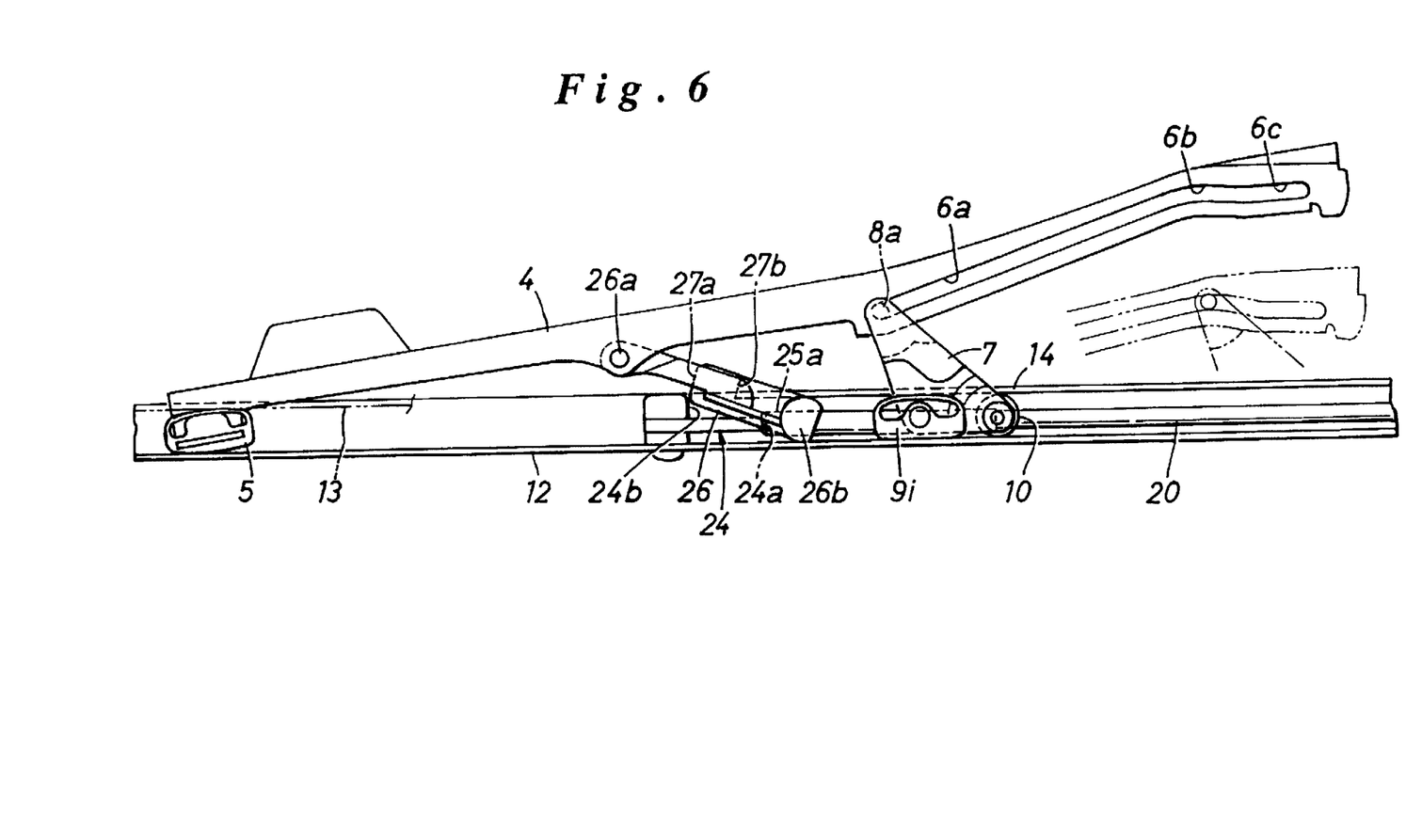
FIG. 6 is a fragmentary side view of an essential part of the slide roof system at its fully tilted up state, an intermediate state being shown by imaginary lines.

When it is desired to raise the rear end of the slide roof 3 or to tilt up the slide roof 3, the push-pull cable 20 is actuated so as to push the rear slider 9 in the forward direction. This causes the elevator link 7 to move forward along the guide rail 11. Because the pin 8 of the first corner 7a of the elevator link 7 is engaged by the guide slot 6 of the stay 4, and forces its way into the inclined section 6a of the guide slot 6, the slide panel 3 is tilted around the front slider 5, and the rear end of the slide panel 3 is raised as illustrated in FIG. 6 as the elevator link 7 moves forward.

Figure 7:
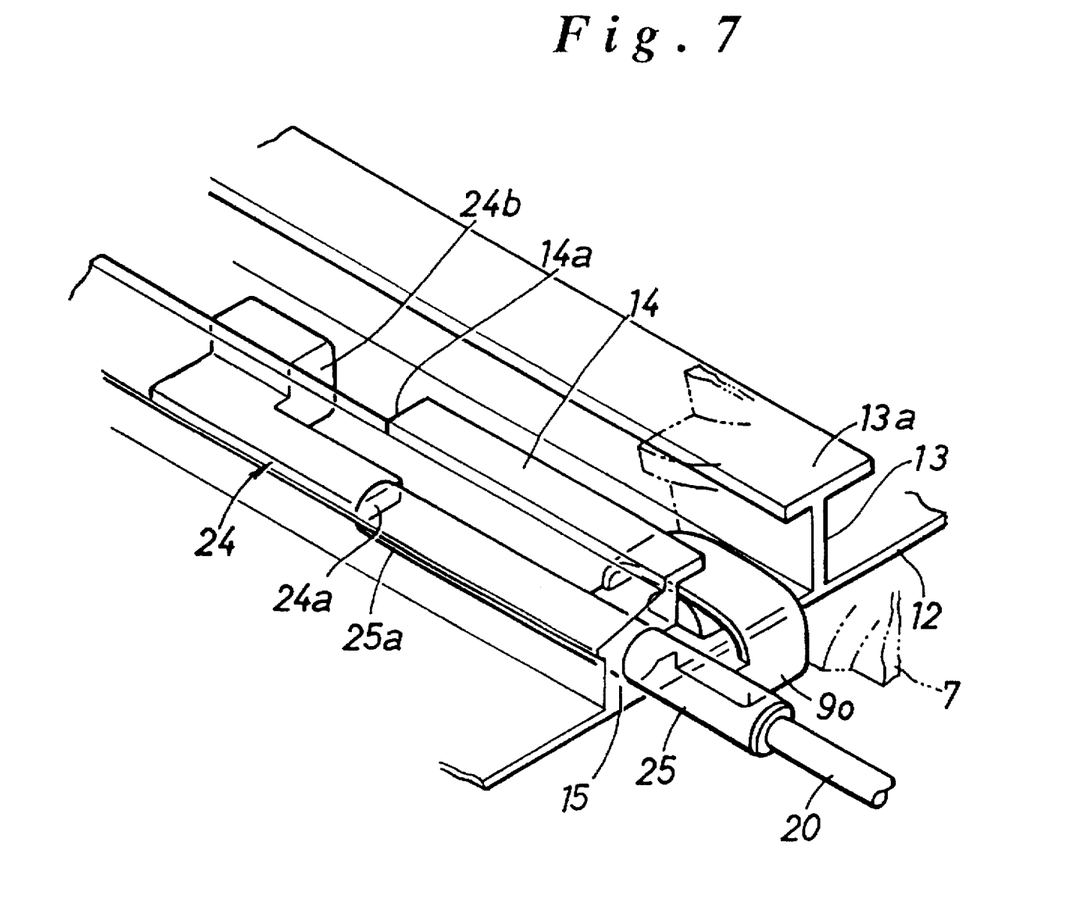
FIG. 7 is a fragmentary perspective view of the pail surrounding the stopper block.

Referring to FIG. 7, a stopper block 24 is fixedly secured to the base 12 in a front end portion of the guide rail 11. The stopper block 24 comprises a first part 24a which substantially fills the inner bore of the C-shaped outer upright wall 15, and a second part 24b which fills the part located under the upper flange 14. The stopper block 24 limits the forward movement of elevator link 7 by the first part 24a of the stopper block 24 abutting the forward end of an extension 25a extending from the cable holder 25 integrally formed with the outer half 9o of the rear slider 9. The second part 24b is spaced apart from the front edge 14a of the upper flange 14, defining a certain gap between the opposing ends of the stopper block 24 and the upper flange 14.

Figure 8:
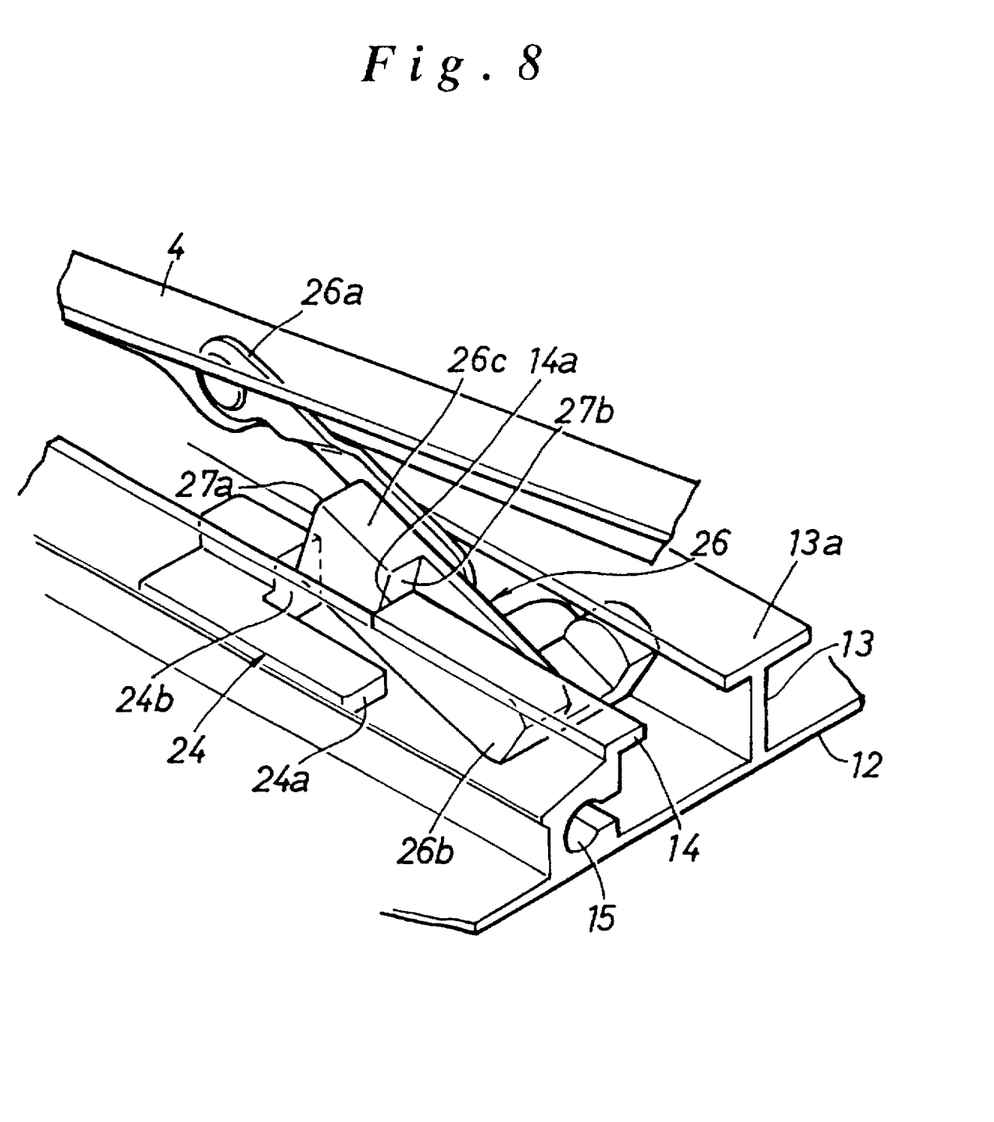
FIG. 8 is a fragmentary perspective view of the part surrounding the support lever.

A forward end of a support lever 26 is pivotably connected to an intermediate part of the stay 4 via a pivot pin 26a while a rear end of the support lever 26 integrally carries a slide block 26b which is slidably engaged in a rectangular slot defined by the two upright walls 13 and 15, the upper flanges 13a and 14 of these upright walls, and the base 12. As best illustrated in FIG. 8, the slide block 26b comprises, at its front end, a rectangular part 26c defining front and rear end surfaces 27a and 27b which are substantially perpendicular to the axial line of the support lever 26.

As the slide panel 3 is tilted up by the forward movement of the elevator link 7, the support lever 26 is also raised with its forward end up by the slide panel 3, and, at the same time, the front end surface 27a of the rectangular part 26c of the slider block 26b abuts the second part 24b of the stopper block 24. Thus, as the support lever 26 rotates around the rear part of the slider block 26b, the sliding engagement between the front end 27a of the rectangular part 26 and the opposing end surface of the second part 24b of the stopper block 24, cooperating with each other in the manner of a cam and a follower, causes a slight receding movement to the support lever 26. However, because the rear end surface 27b of the rectangular part 26 is engaged by the front edge 14a of the upper flange 14 of the outer upright wall 15 as the support lever 26 is raised, the receding movement of the support lever 6 is well controlled, and the slide panel 3 can be tilted up without any looseness or play. This receding movement which is transmitted to the forward edge of the slide panel 3 is advantageous because it substantially reduces the pressure and friction which the edge of the fixed roof opening 2 may otherwise apply to the rubber seal provided on the front edge of the slide panel 3 every time the slide panel 3 is raised or lowered. The reduction in the pressure and friction that are applied to the rubber seal increases the durability of the rubber seal.

By pulling the push-pull cable 20 rearward from the tilted up state illustrated in FIG. 6, the elevator link 7 is moved rearward along the guide rail 11. When the elevator link 7 reaches the position illustrated in FIG. 3, and the slide panel 3 is fully closed, a limit switch not shown in the drawing is activated, and the motor stops.

Figure 9:
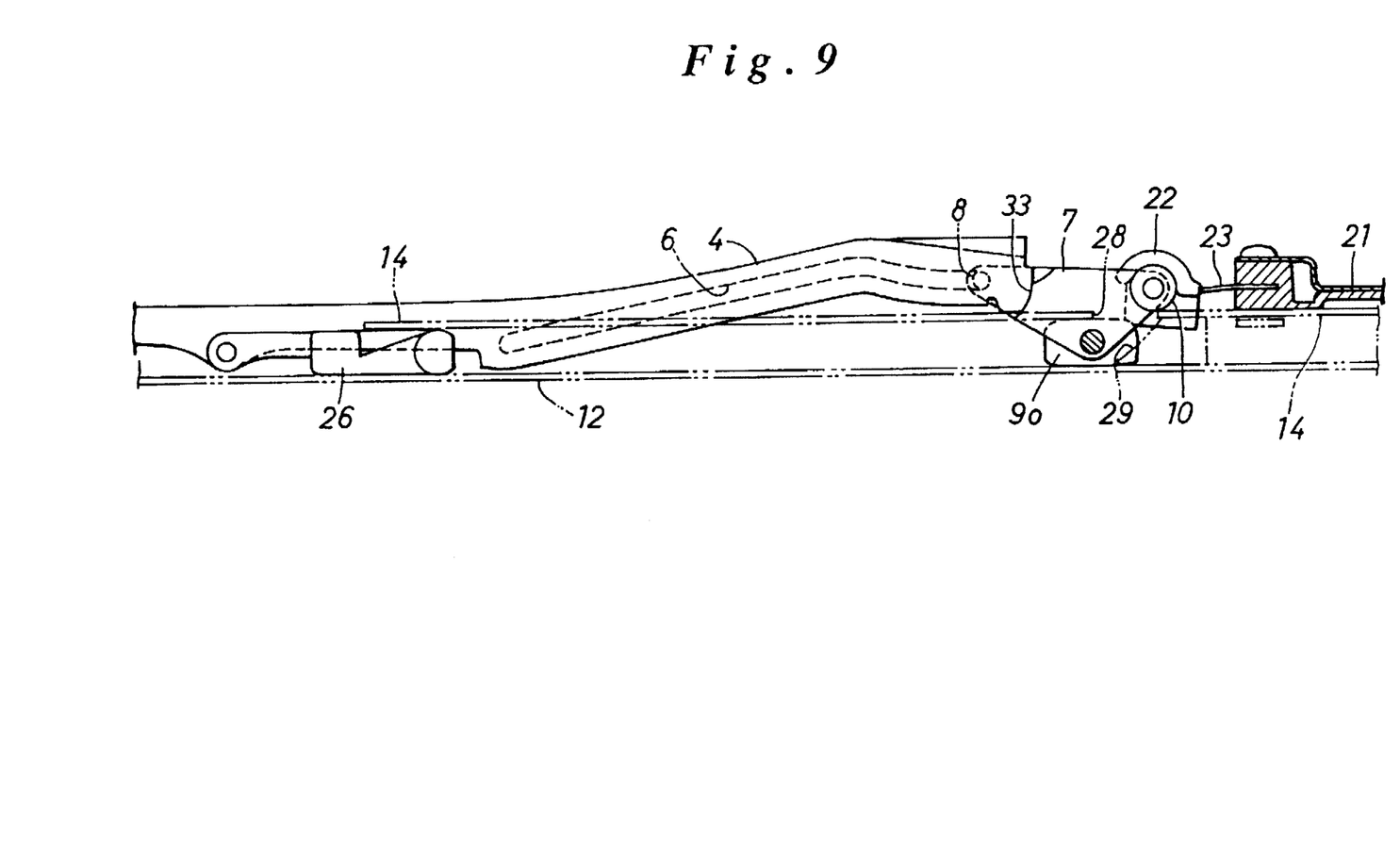
FIG. 9 is a view similar to FIG. 6 showing the slide roof system at an early stage of its rearwardly sliding movement.

When the slide panel 3 is desired to be slid open, the motor is activated by an electric circuit not shown in the drawings, and the push-pull cable 20 is pulled further rearward. When the pin 8a of the first corner 7a of the elevator link 7 reaches a rear end of the guide slot 6, the roller 10 aligns with a cut-out 28 (FIG. 9) provided in the upper flange 14 to allow the upward movement of the roller 10 beyond the upper flange 14. Additionally, a ramp 29 is formed in the corresponding part of the guide rail 11 so as to smoothly raise the roller 10 above the upper flange 14 as the rear slider 9 has moved rearward until the roller 10 rides over the ramp 29. The roller 10, as it reaches the top of the ramp 29, engages the catch member 22. As a result, as illustrated in FIG. 9, the roller 10 is interposed between the catch member 22 and the upper surface of the upper flange 14 while the elevator link 7 tilts forward around the second corner 7b pivotably attached to the rear slider 9. The first corner 7a is thus tilted downward, and the rear end of the slide panel 3 is tilted down.

Figure 10:
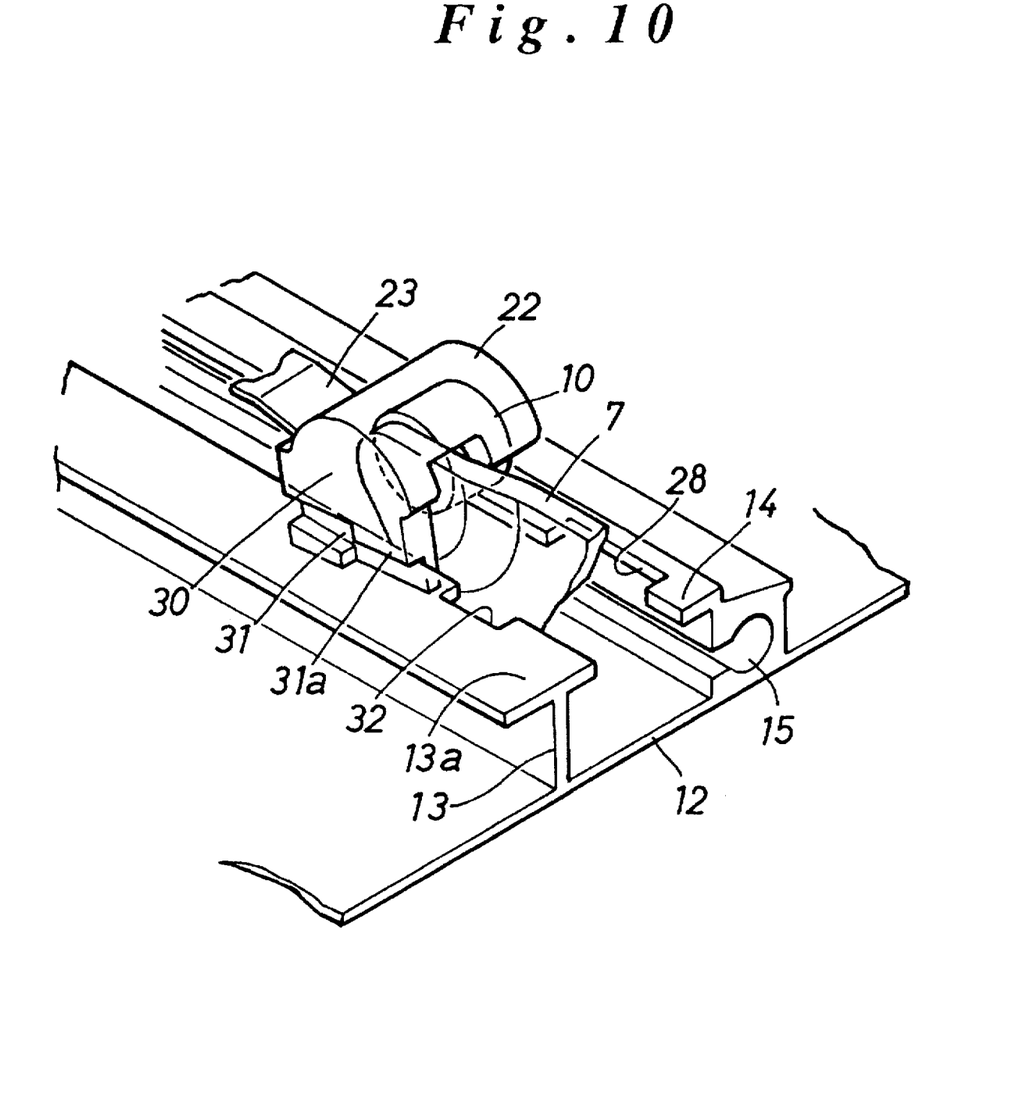
FIG. 10 is a fragmentary perspective view of the part surrounding the catch member provided on each end of the drip channel.

The catch member 22 carries a depending piece 30 (FIG. 10) depending therefrom. The depending piece 22 is provided with a slot 31 which engages the upper flange of the inner upright wall 13, and the upper flange 13a of the inner upright wall 13 is provided with a notch 32 which allows the depending piece 22 to be raised past the upper flange 13a of the inner upright wall 13. The slot 31, in particular the upper shoulder 31a of the slot 31, and the notch 32 are disengaged from each other when the roller 10 has ridden over the upper surface of the flange 14, and has pushed up the catch member 22. This state is illustrated in FIG. 9, and the slide panel 3 is disposed lower than its fully closed position illustrated in FIG. 1.

When the push-pull cable 20 is pulled further rearward and moves the rear slider 9 further back, because the rear end of the slide panel 3 is disposed lower than the fixed roof 1, the slide panel 3 is slid rearward under the fixed roof with the front and rear sliders 5 and 9 guided by the guide rail 11. Because the slot 31 is engaged by the upper flange 13a of the inner upright wall 13, the vertical movement of the catch member 22 is restricted, and the roller 10 interposed between the catch member 22 and the upper flange 14 becomes integrally joined with the catch member 22. Thus, the drain channel 21 is forced to move jointly with the slide panel 3, and can receive rainwater which may drip from the upper surface of the slide panel 3 to conduct it to the gutter 16.

Figure 11:
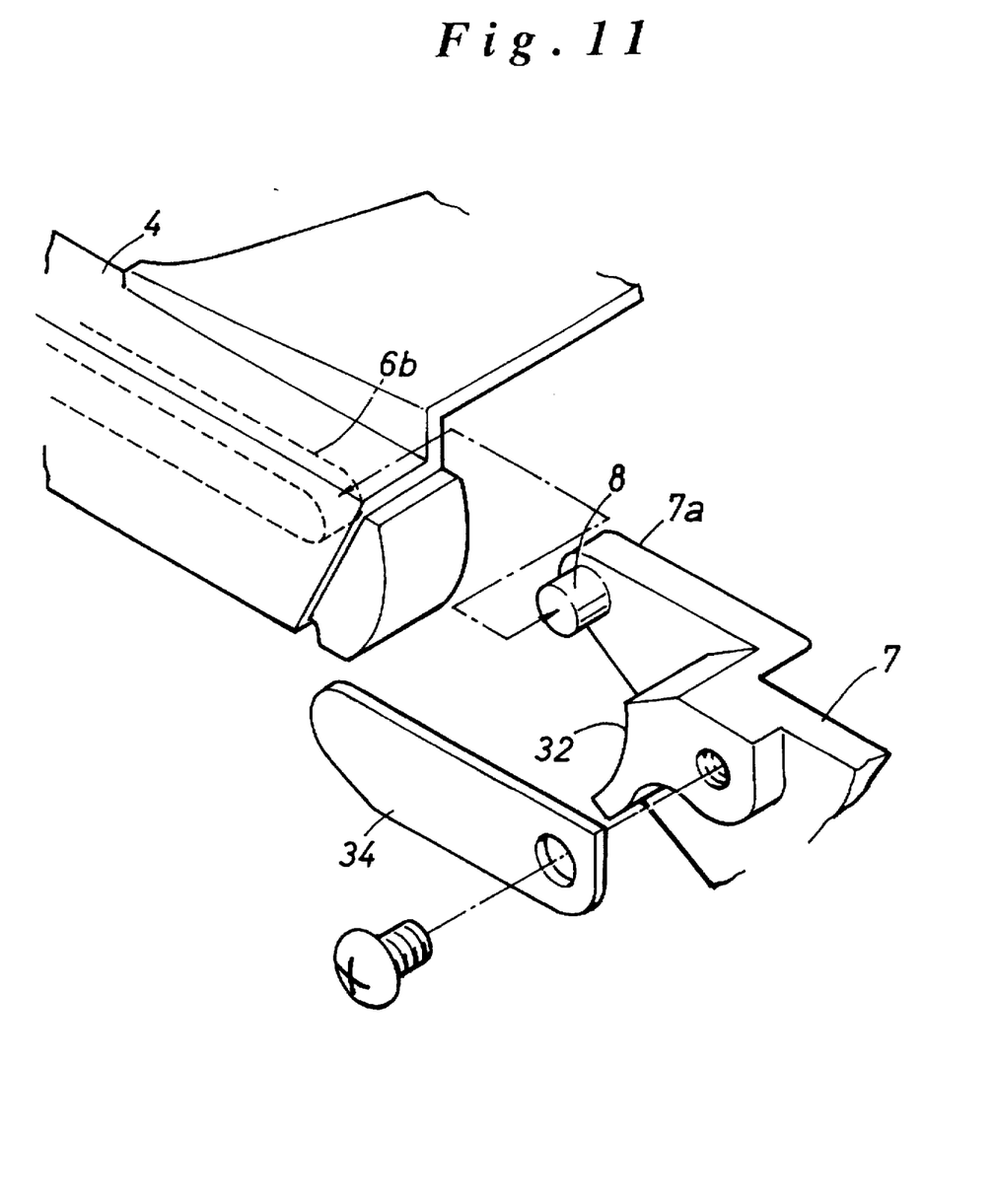
FIG. 11 is an exploded fragmentary perspective view showing the relationship between the elevator link and the rear end of the stay.

When the push-pull cable 20 is pushed forward from the slide panel open position, a convex shoulder surface 32 defined in the first corner 7a of the elevator link 7 complementarily engages the rear end of the stay 4 as illustrated in FIG. 11. The stay 4 is thus pushed forward by the elevator link 7, along with the slide panel 3. A cover plate 34 is secured to the outer side surface of the elevator link 7 by a screw to positively prevent the pin 8 from dislodging from the guide slot 6.

As the elevator link 7 is pushed forward (FIG. 8), the front surface of the rectangular part 26c of the support lever 26 pivotably attached to an intermediate part of the stay 4 eventually engages the second part 24b of the stopper block 23, and this causes the stay 4 to come to a stop. At the same time, the roller 10 drops under the upper flange 14 of the outer upright wall 15 from the cut-out 32 of the upper flange 14. Because the catch member 22 is urged downward by the sheet spring 23 (FIG. 9), the downward movement of the roller 10 causes the depending piece 30 to be engaged by the notch 32 of the upper flange 13a of the inner upright wall 13, and the drain channel 21 is held at that position, and is prevented from moving forward any further. At the same time, the elevator link 7 is tilted backward, thereby raising the rear end of the slide panel 3 into its fully closed position. Because the depending piece 30 of the catch member 22 is kept engaged in the notch 32 of the upper flange of the inner upright wall 13 by the resiliency of the sheet spring 23, the drain channel 21 is prevented from inadvertently moving forward or backward by the vibrations or the acceleration of the vehicle body.

Thus, according to the present invention, because the upper flange of the outer upright wall is interposed between the rear slider and the roller, the slide panel is prevented from making any vertical movement during its closing and opening movement, and the sliding movement of the slide panel can be carried out in a highly smooth fashion. In particular, because the rear end of the slide panel is raised and lowered by the tilting of the elevator link, a relatively large lift can be accomplished while minimizing the vertical dimension of the mechanism for raising and lowering of the rear end of the slide panel.

Figure 12:
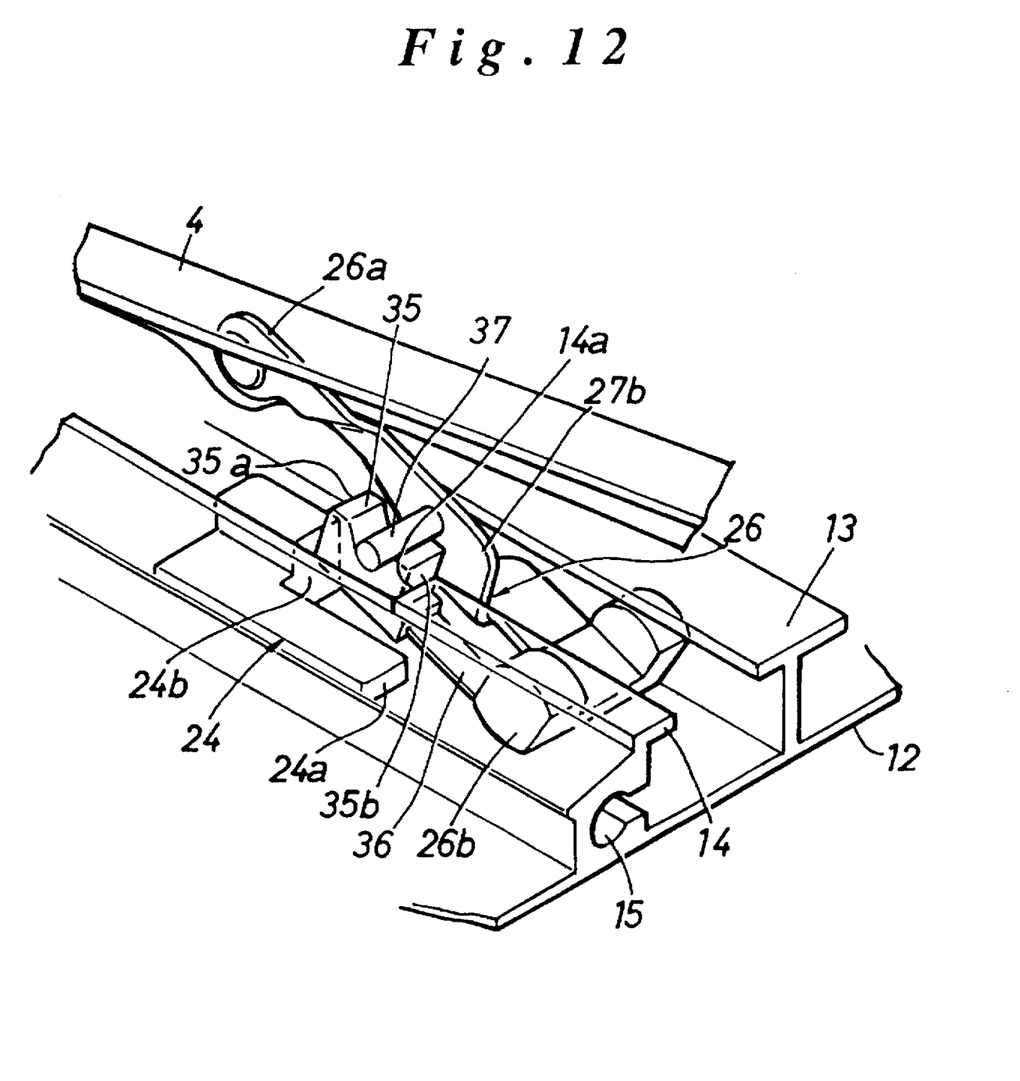
FIG. 12 is a view similar to FIG. 8 showing an alternate embodiment of the engagement block attached to the support lever.

FIG. 12 illustrates a second embodiment of the slide block attached to the rear end of the support lever. In this embodiment, an engagement block 35 corresponding to the rectangular part 26c of the previous embodiment is attached to the slide block 26b via a resilient member such as a sheet spring 36 so that a smooth movement of the rectangular part 26b may be ensured even when there are some dimension errors. According to this embodiment also, as the slide panel 3 tilts up and the support lever 26 rises as a result, the front surface 35a of the engagement block 35 supported by the sheet spring 36 engages the second part 24b of the stopper block 24 while the rear surface 35b of the engagement block 35 is engaged by the front edge 14a of the upper flange 14. The slide panel 3 is thus positively prevented from moving rearward at its tilted up state. An upper surface of the engagement block 35 is engaged by a stud pin 37 projecting laterally from an intermediate part of the support lever 26 so that the engagement block 35 can be positively pushed down to be disengaged from the front edge 14a of the upper flange 14 and/or the second part 24b of the stopper block 24 when the slide panel 3 is tilted down.

Although the present invention has been described in terms of specific embodiments thereof, it is possible to modify and alter details thereof without departing from the spirit of the present invention.

What we claim is:

1. An automotive slide roof system having a slide panel which can be selectively tilted up and slid open, comprising:

an opening provided in a fixed roof of a vehicle body, and having a longitudinal line;

a pair of guide rails extending along opposite sides of said opening in parallel with said longitudinal line, each of said guide rails including a base, an upright wall, and an upper flange extending laterally from an upper end of said upright wall;

a slide panel having a pair of stays depending therefrom along opposite sides thereof;

a cam slot provided in each of said stays and including an inclined section;

a front slider secured to a front end of each of said stays and slidably engaged with an associated one of said guide rails;

a pair of substantially triangular elevator links each including a first corner provided with a first lateral pin engaged by the cam slot of an associated one of said stays, a second corner connected to a rear slider slidably engaged by an associated one of said guide rails, and a third corner provided with roller means for engaging said base of said guide rail when said slide pane is being tilted up, and by said upper flange of said guide rail when said slide panel is being slid open; and a push-pull cable attached to each of said rear sliders to move each said rear slider in either direction along said longitudinal line;

said upper flange being provided with a cut-out for allowing passage of said roller means from a first position at which said roller means is engaged by said base to a second position at which said roller means is engaged by an upper surface of said upper flange;

said inclined section of each of said cam slots tilting up a rear end portion of said slide panel as said elevator links are pushed forward from a fully closed state of said slide panel by said push-pull cables attached to said rear sliders, and as said first lateral pins are moved in said cam slots;

each of said elevator links being tilted forward via incline means as said elevator links are pulled rearward from said fully closed state of said slide panel by said push-pull cables, thereby lowering a rear end of said slide panel so as to allow said slide panel to be slid open without interference by a part of said fixed roof located behind said opening.

2. An automotive slide roof system according to claim 1, wherein said roller means comprises a roller pivotably attached to said third corner of each of said elevator links via a second pivot pin extending laterally from each of said elevator links.

3. An automotive roof system according to claim 2, wherein each of said rollers is engaged between said upper flange and said base of an associated one of said guide rails when said roller is at said first position.

4. An automotive slide roof system according to claim 3, further comprising resilient means for said urging said rollers against the upper surfaces of said upper flanges of said guide rails when said rollers are at said second position, said resilient means being movable jointly with said rollers as said slide panel is slide rearward from said fully closed state.

5. An automotive slide roof systems according to claim 2, wherein said incline means comprises each of said guide rails being provided with a ramp upon which each of said rollers rides over as said elevator link is pulled rearward and said first lateral pin reaches a rear end of said cam slot so that said roller smoothly moves over from said first position to said second position.

6. An automotive slide roof systems according to claim 2, further comprising a drip channel extending across said guide rails, and slidably engaged by said guide rails, each lateral end of said drip channel including a catch member with resilient biasing means for resiliently engaging an associated one of said rollers when said roller moves over from said first position to said second position.

7. An automotive slide roof system according to claim 6, wherein said resilient biasing means includes a spring connected to each one of said catch members to resiliently urge said catch members and said engaged rollers against said upper surfaces of said upper flanges.

8. An automotive slide roof system according to claim 6, wherein a lateral flange provided in each of said guide rails includes a notch engaged to a part of an associated one of said catch members as said elevator links are moved forward to fully close said slide panel and said rollers are disengaged from said catch members.

9. An automotive slide roof system according to claim 1, wherein each of said elevator links is provided with a front surface for pushing an opposing rear surface of an associated one of said stays when said slide panel is being pushed forwarded by said push-pull cables via said rear sliders and said elevator links.

10. An automotive slide roof system according to claim 9, wherein said front surface of each of said elevator links and said rear surface of the corresponding stay comprise mutually complementary curved surfaces.

11. An automotive slide roof system according to claim 1, wherein each of said guide rails comprises a C-shaped upright wall defining an inner bore extending along said longitudinal line, and each of said push-pull cables is passed inside an associated one of said inner bores, each of said rear sliders being provided with a cable holder which is located inside the corresponding inner bore to secure a free end of an associated one of said push-pull cables, a stopper block being provided inside each of said inner bores to define an end of a forward movement of the corresponding elevator link.

12. An automotive slide roof system according to claim 1, further comprising a support lever having a first end pivotably attached to an intermediate part of each of said stays, and a second end slidably engaged by the corresponding guide rail, each of said support levers being provided with an engagement block which engages a front edge of an upper flange of the corresponding guide rail as said support lever is raised by a tilting movement of said slide panel.

13. An automotive slide roof system according to claim 12, wherein each of said support levers is provided with a front cam surface which abuts an opposing end surface of a stopper block securely attached to the corresponding guide rail, said front cam surface being profiled so as to cause a slight receding movement to said support lever by cooperating with said opposing end surface of said stopper block as said support lever is raised with its front end up by said slide panel.

14. An automotive slide roof system according to claim 12, wherein each of said engagement blocks is provided with a front cam surface which abuts an opposing end surface of a stopper block securely attached to the corresponding guide rail, said front cam surface being profiled so as to cause a slight receding movement to said support lever by cooperating with said opposing end surface of said stopper block as said support lever is raised with its front end up by said slide panel.

15. An automotive slide roof system according to claim 14, wherein said engagement block is resiliently supported by a part of said support lever.

16. An automotive slide roof system according to claim 15, wherein said support lever is provided with an extension which positively disengages said engagement block from said front edge of said upper flange of said guide rail and said opposing end surface of said stopper block by directly pushing down said engagement block as said support lever is lowered by said slide panel.

* * * * *